L. EMBREY.
DOUGH WORKING APPARATUS.
APPLICATION FILED FEB. 12, 1915.
1,171,330. Patented Feb. 8, 1916.
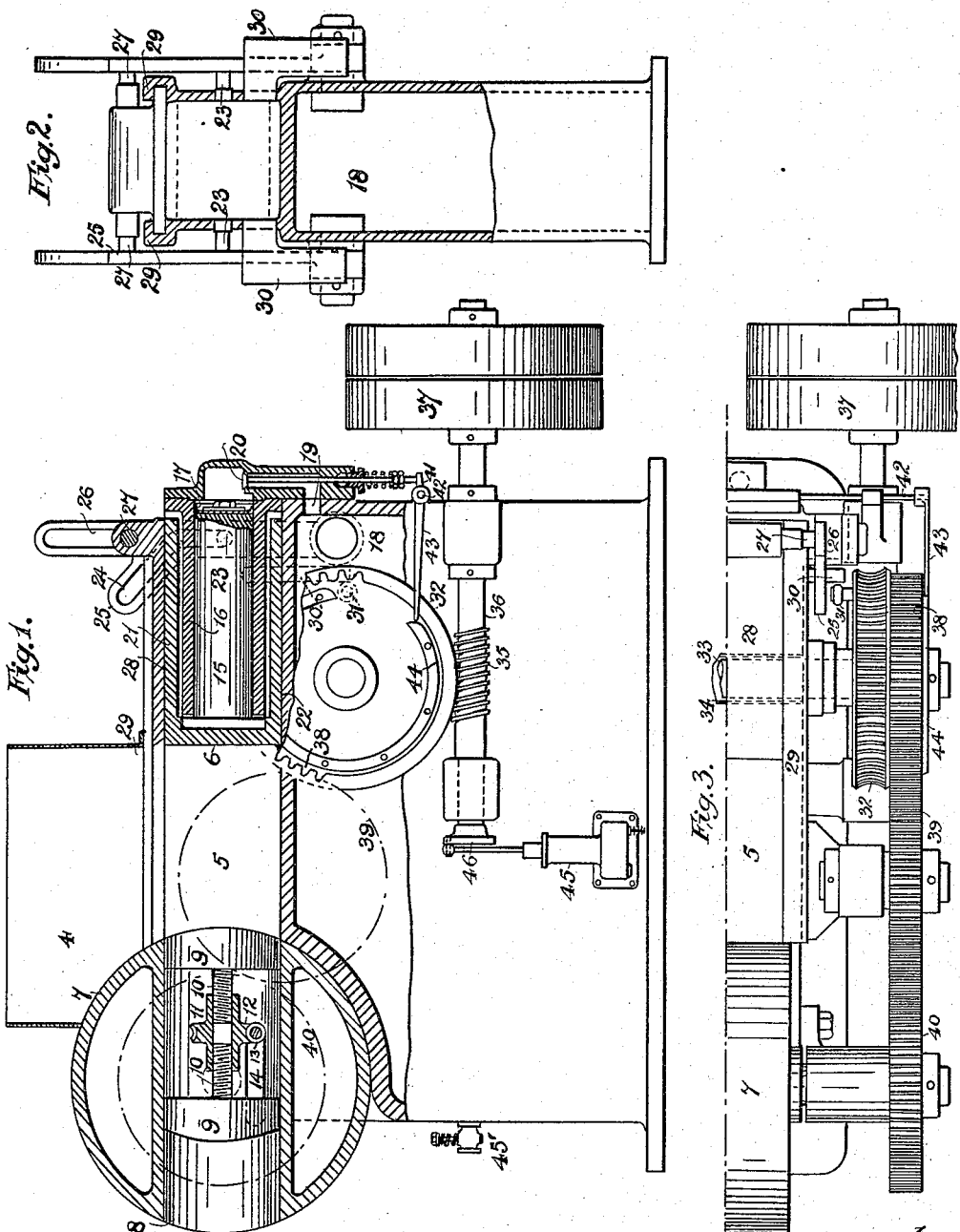
Witnesses
Inventor
L. Embrey.

ized. The valve 20 is operated through a rod

UNITED STATES PATENT OFFICE.

LAURENCE EMBREY, OF STOKE-UPON-TRENT, ENGLAND.

DOUGH-WORKING APPARATUS.

1,171,330.   Specification of Letters Patent.   Patented Feb. 8, 1916.

Application filed February 12, 1915. Serial No. 7,831.

*To all whom it may concern:*

Be it known that I, LAURENCE EMBREY, subject of the King of Great Britain and Ireland, residing at Stoke-upon-Trent, Staffordshire, England, have invented certain new and useful Improvements in Dough-Working Apparatus, of which the following is a specification.

This invention relates to machines for dividing dough and like plastic materials. The function of a dough divider is to supply a predetermined quantity of dough which is molded and then baked. The method usually adopted is to place a quantity of dough under a fixed pressure in a chamber of definite size. The quantity of dough is cut or separated from the mass and compressed at the fixed pressure into the chamber. Pressure applied by cams and dashpots is not effective although it permits of varying stroke of the compressing piston. Falling weights also cause difficulties as they are cumbersome and when no dough is in the machine are liable to break the machine. In addition these methods treat the dough too harshly. It has also been suggested to place the dough under fluid pressure so that it is squeezed into the chamber of fixed size. This method for obvious reasons is unsatisfactory as it is slow and inaccurate.

The object of the present invention is to to overcome these difficulties hitherto associated with dough dividers and to this end it consists in means for cutting pieces of dough from the mass and subjecting them to a fixed pressure derived from a piston which is subjected to fluid pressure. The fluid pressure may be obtained from air or water.

The invention also comprises various details of construction as hereinafter set forth and described with reference to one illustrative construction which is shown by way of example in the accompanying drawings in which:—

Figure 1 is a partial sectional side elevation. Fig. 2 is an irregular section at right angles to that of Fig. 1. Fig. 3 is a plan of half of the device.

In carrying the invention into effect according to the form shown, the dough is contained in a hopper 4 and from this it passes partly under gravity and partly by a suction action into a compartment 5. To the right of this compartment or chamber 5 in Fig. 1 there is a movable ram 6 which is under fluid pressure and to the left there is a drum 7 having a cross channel 8 therein. The cross channel 8 contains a piston formed of two end parts 9 having threaded stems 10 which engage in a nut or sleeve 11. The threads are of opposite hand so that on rotating the sleeve 11 the heads or end parts 9 are brought nearer together or farther apart. In this way the space in the cross channel 8 available for dough, when the ram 6 is pressed forward, may be adjusted. The rotation of the sleeve 11 is effected by a worm wheel 12 and worm 13. The shaft of the worm 13 is slidable in a slot 14 and is provided on its external portion with a hand wheel. This part of the apparatus offers no substantial novelty.

The ram 6 may be of square section with rounded corners, and has fixed to it a cylindrical ram 15 which fits in a cylinder 16 and may be packed at its end as for instance by a leather or like ring 17. The fluid for operating the ram 15 may be air contained in a closed chamber 18, which forms the frame of the machine. From this chamber the air passes by a port 19 and valve 20 into the cylinder 16. The ram 6 is provided with rearwardly extending sliding faces 21 and 22. The side walls carry pins 23 which engage in slots 24 in side levers 25. The levers 25 have also slots 26 in which there engage pins 27 which are carried by the sliding knife 28. The knife 28 is guided in guides 29. Owing to the angular shape of the slot 24, the sliding knife 28 is shot across to sever the dough in the chamber 5 from that in the hopper 4, well before the ram 6 has completed its stroke. The severed dough is then pushed by the ram 6 from the chamber 5 into the channel 8 in the rotary drum 7. The piston heads 9 retreat in front of the dough thus pressed into position. The ram 6 is also provided with side horns 30 which are adapted to engage with rollers 31 on rotary disks 32. The disks 32 are mounted on a cross shaft 33 which passes through a tubular sleeve 34 which bridges across the side walls of the chamber 18. On one side, the front side in Fig. 1, the disk 32 is in the form of a worm wheel which engages a screw 35 on a shaft 36 driven by the pulley 37. As the rollers 31 engage the lugs 30, they press these lugs from left to right in Fig. 1, and consequently return the ram 6 and sliding knife 28 to the positions illustrated in Fig. 1 from their outward positions. The suction action created in chamber 5 by the retreat of the ram 6 aids the filling of this chamber with dough from the hopper 4. In the meantime the drum 7 has been rotated so that the dough already pressed into the available space in the channel 8 is not withdrawn by this suction action. Alongside the worm wheel 32 there is a gear wheel 38 which, however, has only teeth on half its circumference. This wheel gears with a wheel 39 which in turn gears with a wheel 40 for driving the drum 7. With this mechanism the drum 7 is rotated through half a revolution at intervals and the movement is so timed that it is initiated before the rearward movement of the ram 6 commences and has ceased when the ram 6 moves forward under the fluid pressure from the closed container 18. The dough pressed in on one side of the piston 9—9 is thus in the cavity of channel 8 to the left of this piston and when the next quantity of dough is pressed in position, the previously pressed in lump is ejected.

Communication between the chamber 18 and the cylinder is established at the proper times by a valve 20 which is operated by a lever 41 pivoted at 42 and an arm 43 is provided on this pivot which engages a cam ledge 44 fixed on the side of a gear wheel 38. The chamber 18 is filled with compressed air by a small pump 45 driven by a crank 46 on the shaft 36.

It will be seen that this device occupies small space and that the piston 15 is free during its forward stroke and the forward stroke of the piston 15 is therefore variable to suit the compressibility of the dough, the piston being arrested when the resistance of the dough balances the force set up by the fluid pressure. The pressure in the vessel 18 is maintained constant by the provision of the suitable relief valve 45'. At the same time the pressure is elastic as opposed to the harsher pressure obtained by weight, and the dough is therefore not subjected to shock likely to rupture the cells of the gluten.

I claim:—

1. A dough divider comprising means for cutting off pieces of dough from a mass thereof, a receiver of definite volume, a piston for forcing said pieces into said receiver, an expansible fluid pressure motor for impelling said piston toward said receiver, and mechanical means for moving said piston away from said receiver, substantially as and for the purpose hereinbefore set forth.

2. A dough divider comprising means for cutting off pieces of dough from a mass thereof, a receiver of definite volume, a piston for forcing said pieces into said receiver, an expansible fluid pressure motor for impelling said piston toward said receiver, and mechanical means for moving said piston away from said receiver, a reservoir for compressed fluid for operating said fluid pressure motor, and a pump for supplying compressed fluid to said reservoir, substantially as and for the purpose hereinbefore set forth.

3. A dough divider comprising means for cutting off pieces of dough from a mass thereof, a receiver of definite volume, a piston for forcing said pieces into said receiver, an air pressure motor for impelling said piston toward said receiver, mechanical means for moving said piston away from said receiver, a reservoir for compressed air for operating said air pressure motor, and means for maintaining said reservoir full of air at constant pressure, substantially as hereinbefore set forth.

4. A dough divider comprising a hopper for a mass of dough, means for cutting off pieces of dough from said mass, a receiver and a piston for forcing said pieces into said receiver, means for reciprocating said piston, comprising a ram connected to said piston, a cylinder for said ram, a reservoir for compressed air, an air conduit between said reservoir and cylinder, a valve for controlling said conduit, means for operating said valve for each reciprocation of the ram, and mechanism for returning the ram, against the pressure air in the cylinder after each operative stroke of the ram, substantially as hereinbefore set forth.

5. A dough divider comprising a dough chamber, a rotatable receiver of definite volume, a cylinder, a piston slidable therein, a pressure air reservoir, a rotary driving member, teeth on a portion of the periphery of said driving member, gearing intermittently engaging said teeth and operatively connected to said receiving chamber, a cam on said rotary driving member, valve mechanism operable by said cam and controlling the admission of pressure air to said cylinder, a projection on said driving member and a push plate on the piston and engaging with said projection to return the piston against the air pressure in the reservoir, substantially as described.

In testimony whereof I have signed my name to this specification in the presence of two subscribing witnesses.

LAURENCE EMBREY.

Witnesses:
FRANK MADSLEY,
VINCENT FLACKETT.